UNITED STATES PATENT OFFICE.

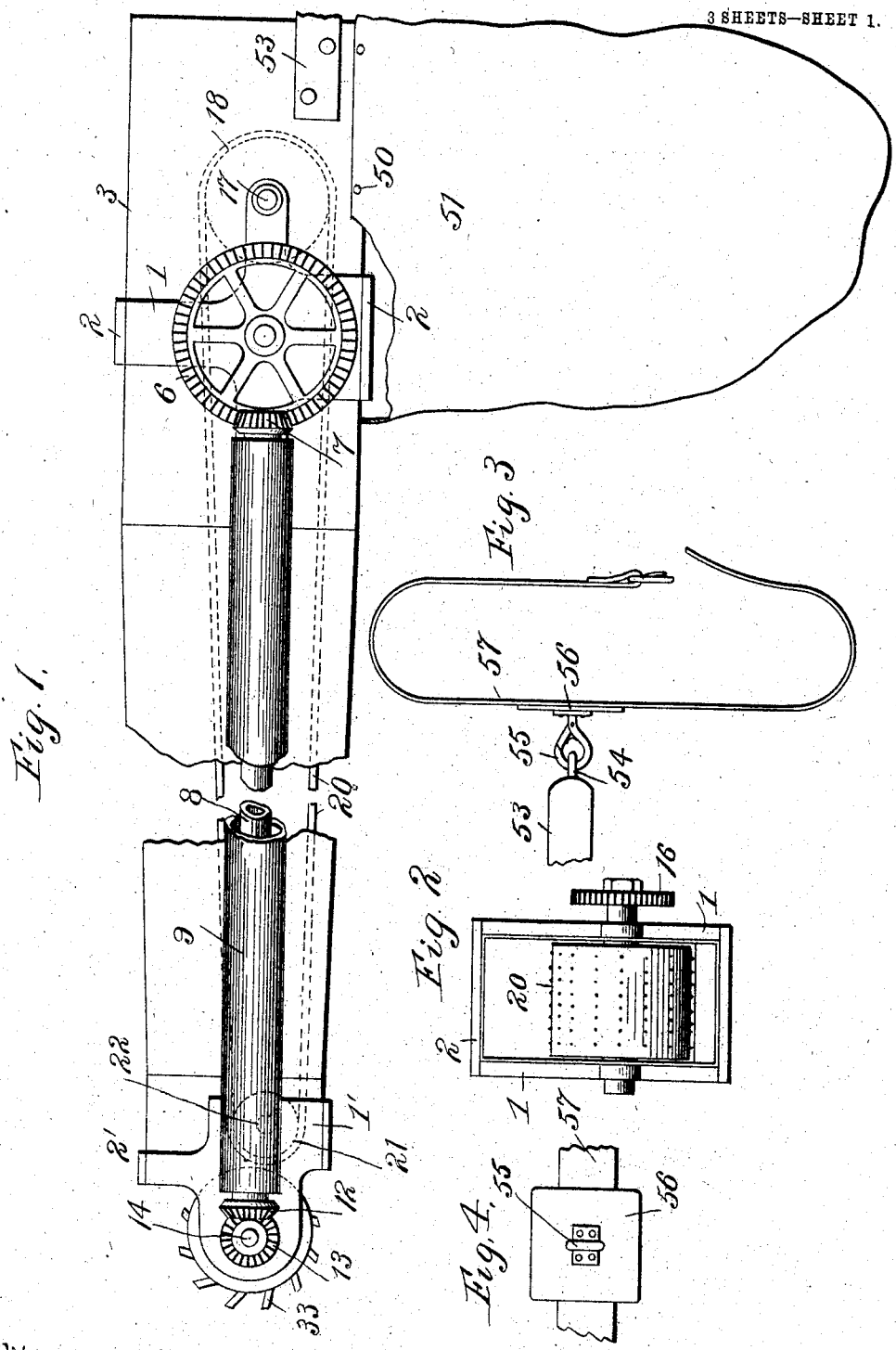

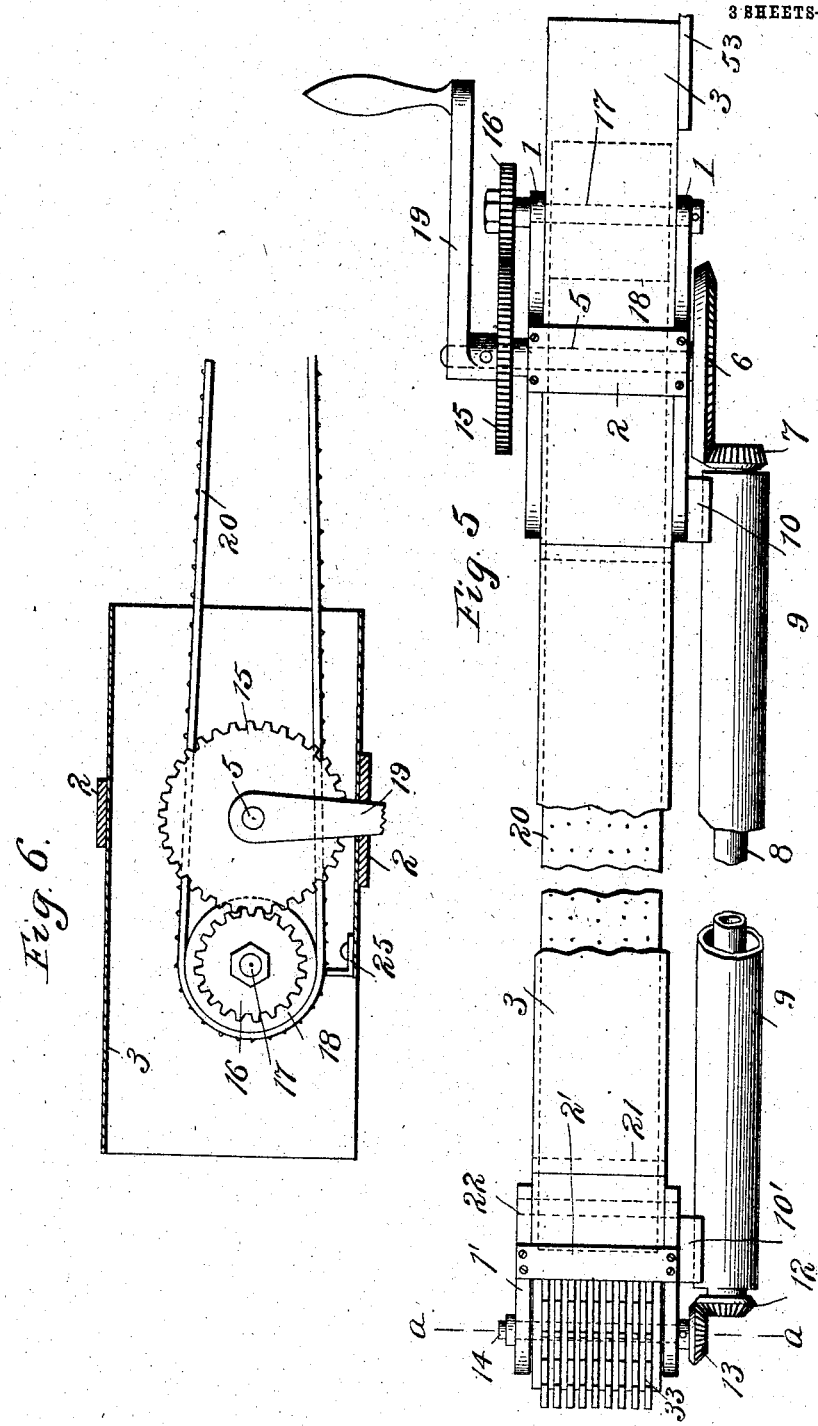

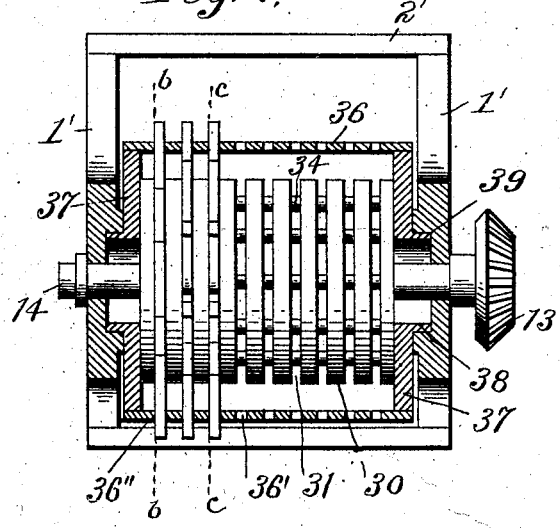
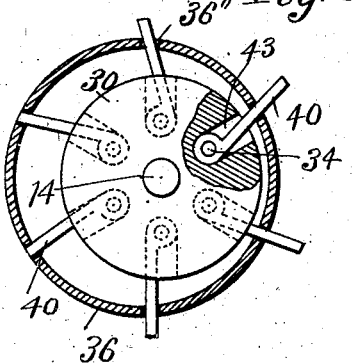
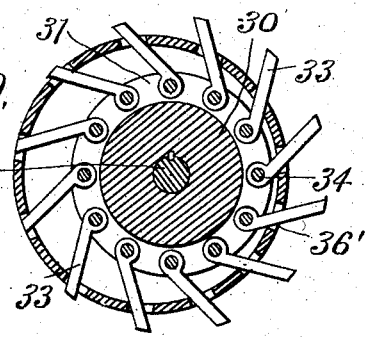
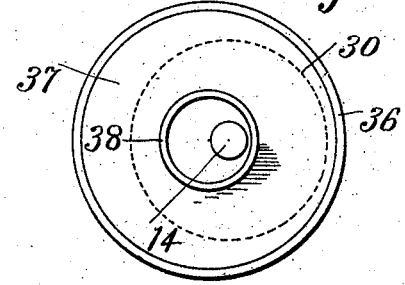
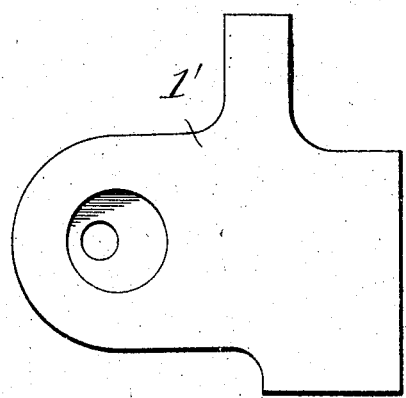

THEODORE H. PRICE AND WILLIAM P. QUENTELL, OF NEW YORK, N. Y., ASSIGNORS TO UTILITY COTTON PICKER COMPANY, OF NEW YORK, N. Y., A CORPORATION OF NEW YORK.

HAND COTTON-HARVESTER.

No. 796,245.     Specification of Letters Patent.     Patented Aug. 1, 1905.

Application filed August 13, 1904. Serial No. 220,607.

*To all whom it may concern:*

Be it known that we, THEODORE H. PRICE and WILLIAM P. QUENTELL, citizens of the United States, residing in the borough of Manhattan, city, county, and State of New York, have invented certain new and useful Improvements in Hand Cotton-Harvesters, of which the following is a specification.

This invention relates generally to improvements in cotton-harvesters, and specifically to the class known as "hand harvesters or pickers."

The object of the invention is to simplify the construction of cotton-harvesters or pickers and produce a machine that will be simple and economical in construction, practical in operation, and have its picking mechanism so constructed that it can be easily controlled by the operator and at the same time so arranged that the picking-fingers will seize the cotton, carry it to, and deposit it upon suitable means for conveying it to a desired receptacle. Heretofore in this class of cotton harvesters or pickers the direct picking members or fingers have generally been arranged radially upon a belt, wheel, or other suitable device in such manner that when they strike the cotton-boll they tend to push it away and not seize the cotton; but in the present construction this difficulty has been obviated by having the fingers supported tangentially to their driving member, so that when they strike the cotton-boll the cotton is seized and drawn toward the driving member and finally deposited upon suitable conveying mechanism.

A further object of the invention is to so construct the mechanism that it can be suitably supported from a belt secured around the waist of the operator and be free to be moved in any direction in order to bring it in contact with the cotton while being operated, thereby removing the strain of supporting it by the hand of the operator, at the same time permitting the operating-handle to be freely rotated while the picker is being moved into any desired position.

With these ends in view we have devised and constructed the hereinafter-described invention, which will first be explained as to detail and then specifically pointed out in the annexed claims and in the accompanying drawings.

Figure 1 is a side elevation of the machine, partially broken away to more clearly illustrate the same. Fig. 2 is an end elevation looking to the left of Fig. 1 with certain parts omitted. Fig. 3 is a detailed plan view of the belt and connections used by the operator to support the machine. Fig. 4 is a detail view of the supporting-plate secured to the operator's belt. Fig. 5 is a plan view partially broken away. Fig. 6 is a vertical section of the casing, showing how the conveyer-belt is operated. Fig. 7 is a vertical section on the line $a\ a$, Fig. 5, and shows how the cotton-picking fingers are supported. Fig. 8 is a vertical section on the line $b\ b$, Fig. 7, showing the shell-driving fingers. Fig. 9 is a vertical section on the line $c\ c$, showing how the cotton-picking fingers are supported. Fig. 10 is a side elevation of one of the supporting-frames, showing the eccentric relation of the finger-supporting cylinder and the shell for disengaging the cotton from the picking-fingers. Fig. 11 shows part of the frame in which the finger-supporting cylinder and shell are supported.

In the practical application and construction of our invention 1 1' are the main frames of suitable shape and are secured together by plates 2 2' in such manner that the operating mechanism is properly supported therein. Supported within the framework is a casing 3, within which the conveying-belt is supported. Passing transversely through the main supporting-frame 1 is a shaft 5, upon one end of which is mounted a bevel-gear 6, said bevel-gear being adapted to mesh with and drive a bevel-gear 7, arranged at right angles to gear 6 and mounted on a shaft 8. This shaft 8 is suitably supported within a tubing 9, said tubing in turn being supported in proper position with relation to the casing 3 by means of blocks 10 10', as shown in Fig. 5. The shaft 8 also has mounted thereon a bevel-gear 12, which meshes with and drives a bevel-gear 13, supported on a shaft 14, said shaft being suitably journaled within the supporting-frames 1' and is adapted to operate the picking-fingers in a manner hereinafter described. Rigidly mounted on the shaft 5 on the opposite side of the casing to the bevel-gear 6 is a gear 15, which meshes with and drives a pinion 16, mounted on a shaft 17, suitably journaled in the supporting-frame 1.

The shaft 5 also has mounted thereon a handcrank 19, by means of which the said shaft 5 is driven by the operator.

Mounted on the shaft 17 within the casing 3 is a pulley 18, which supports and drives the conveyer-belt 20. This conveyer-belt extends forward within the casing 3 sufficiently far to allow the cotton after being gathered to be deposited thereon and carried rearwardly and deposited within the receiving-bag. The forward end of the conveyer-belt is supported on a pulley 21, the supporting-shaft 22 of said pulley being suitably journaled within the supporting-frame 1'. In the construction of the conveyer-belt, which for lightness and ease of operation is preferably made of canvas or other similar light material, pins or serrated plates are placed on the outer surface thereof, so that the cotton when deposited thereon by the picking-fingers will be positively conveyed to the receiving-receptacle.

Mounted within the casing 3 at the rear end thereof is a scraper 25, which is placed transversely within said casing and directly under the belt upon the driving-pulley 18, so that when the cotton is carried rearwardly on the conveyer-belt it will be removed therefrom if it has a tendency to adhere to said belt when it is engaged by the scraper, as shown in Fig. 6.

The cotton-picking fingers and the means for driving the same are suitably journaled upon the shaft 14, which is supported in the framework 1', the construction and operation of which are shown in detail in Figs. 7, 8, 9, and 10. 30 is a cylinder rigidly mounted on or formed integral with shaft 14 and is provided with circumferential grooves 31, in which are supported the picking-fingers 33. These picking-fingers 33 are journaled on rods 34, which extend longitudinally through the cylinder 30 and support the picking-fingers in such manner that they are free to oscillate on rods 34 when the machine is in operation. Each set of picking-fingers is preferably twelve in number and arranged in the manner shown in Fig. 9—that is, so that the fingers do not project radially from the supporting-cylinder 30, but are supported tangentially thereto, thereby allowing the fingers to engage the cotton-boll and pull it toward the cylinder and not force it away, as is the case when the fingers are arranged radially.

Supported within the framework 1' and surrounding the cylinder 30 is a shell 36, the heads 37 of said shell being provided with hubs 38, which project within the frame 1' sufficiently far to form a journal-bearing for the same, as shown at 39. It will be noticed by referring to Figs. 8, 9, and 10 that the shell 36 and the cylinder 30 are journaled eccentrically to each other. The object of this eccentric relation is clearly shown by referring to Fig. 9, where it will be seen that by rotating both the cylinder and shell at the same speed the picking-fingers 33 will project through the openings 36' in shell 36 at the forward end thereof sufficiently far to engage the cotton and carry it around to a position to be deposited upon the conveyer-belt 20. When the fingers reach a position diametrically opposite to the picking position, they will have been drawn within the shell, thereby removing the cotton therefrom and allowing it to fall on the conveyer-belt. Shell 36 is driven by the cylinder 30 through the medium of the driving-fingers 40, which are supported by the cylinder 30 and project through openings 36'' in the shell 36. By referring to Fig. 8 it will be noticed that the fingers 40 are supported in radial recesses 43 in cylinder 30 and are free to oscillate a sufficient distance within said recess in order to enable them to vary their positions as they drive the shell 36. It will be further noticed that the shell 36 is operatively engaged and driven by one finger at a time—that is, the lower finger, as shown in Fig. 8, is engaged in one of the openings 36'', the back of the finger 40 resting against the wall of the recess 43, so that as the cylinder is rotated the finger will cause the shell to be rotated. When the lower finger changes its position, the succeeding finger will gradually assume the same position that the previous finger assumed and engage the side wall of the recess in the same manner and continue to rotate the cylinder. Thus as the several fingers reach the lower vertical position they will become driving-fingers and rotate the shell with a speed uniform with that of the cylinder. Having the picking-fingers mounted tangentially in the driving-cylinder and capable of being withdrawn from active operation when the cylinder and shell are rotated and again projecting through the shell after having deposited the cotton on the conveyer form the most important features of the present invention.

The driving-gear mechanism is preferably arranged in such manner and with such proportion and relation to each other that operation of the crank 19 will, through the gears 6 and 7, carry an increased speed to the shaft 14 and the mechanism operated thereby. The conveyer-belt is also driven at a speed greater than the speed of the crank 19 and is preferably geared with just sufficient speed to allow the picking-fingers to deposit the cotton on the conveyer-belt without crowding or packing the same.

Removably secured at the rear end of the machine to the casing 3, by means of pins 50 or other suitable means, is a receiving-bag 51, into which the cotton is deposited from the conveyer-belt. This bag or receptable may be of any suitable design or construction and may be attached to the casing in any suitable manner.

Attached to the side of the casing near the rear end in any suitable manner, as shown in Figs. 1, 3, and 5, is a plate 53, having on its rearwardly-projecting end an eye 54, which is adapted to be engaged by a snap-hook 55, said snap-hook being fastened to a plate 56, carried by a belt 57. This belt 57 encircles the waist of the operator and is fastened thereto, so that the machine can be supported from the body of the operator instead of compelling the operator to support the entire machine with one hand while he operates it with the other. By having the above-described loose connection or swivel-joint between the belt and casing, as shown in Fig. 3, it will be readily seen that the operator has complete control of the machine to move it in any direction that may be desired in order to bring the pickers in engagement with the cotton for the purpose of gathering the same. The weight of the entire machine is almost entirely supported by the body of the operator, allowing the free use of one hand to move it in whatever direction desired, at the same time permitting the machine to be operated by the other hand of the operator.

The general operation of the machine is as follows: Assuming that the operator has secured the machine to his body by means of the belt 57, it is in position to be operated. The machine is guided by one hand and the picking-fingers 33 placed in engagement with the cotton-boll. With the other hand the crank 19 is operated, which will rotate shaft 5, bevel-gear 6 in turn driving bevel-gear 7, shaft 8, and bevel-gear 12. The shaft 14 is then driven through the bevel-gear 13 by meshing with the bevel-gear 12 in the manner above described. Thus it will be seen that the cylinder 30 will be rotated and the driving-fingers 40 will engage the shell 36 and drive it, thereby causing the picking-fingers to be operated, so that the cotton is gathered and deposited upon the conveyer-belt, where it is carried rearwardly over pulley 18 and deposited within the sack or receptacle 51. Simultaneously with the operation of the mechanism for driving the picking-fingers by the operation of the hand-crank 19 the gear 16 will be driven by gear 15, mounted on shaft 5, and shaft 17 will rotate the pulley 18, thereby driving the conveyer-belt and carrying the cotton from the picking-fingers to the receiving-receptacle.

Of course it should be understood that certain details of construction can be varied without departing from the spirit of the invention.

Having thus described our invention, the following is what we claim as new therein and desire to secure by Letters Patent:

1. In a machine of the character described, the combination with a main frame and casing, and a suitably-operated cotton-picking means; of a suitably-operated conveyer-belt arranged to receive cotton from said cotton-picking means extending within and approximately parallel with one wall of said casing and provided on the side next the said wall with short projections whereby a rolling motion is imparted to the cotton between the belt and the wall of the casing.

2. In a machine of the character described, the combination with a main frame and casing, a rotating cotton-picking means, operating means therefor, means for removing the cotton from the picking means; of a receptacle, a conveyer-belt arranged to receive cotton removed from said cotton-picking means extending within and approximately parallel with one wall of said casing for conveying cotton from said picking means to said receptacle and provided on the side next the said wall with short blunt projections which impart a rolling motion to the cotton, and means for operating said belt conveyer.

3. In a cotton-picking machine of the type described, the combination of a hand-directed cotton-picking member having means for automatically and positively freeing itself from the cotton picked, with a conveyer member arranged in operative relation to the cotton-picking member and adapted to receive the cotton therefrom and convey it to a suitable receptacle, a receptacle into which said conveyer member deposits the cotton, and means for operating the cotton-picking and conveyer members, substantially as described.

4. In a hand-directed cotton-picking machine, the combination of a tubular casing having an open cotton-receiving end, a conveying-belt supported within and extending lengthwise of said casing, with suitable cotton-picking means mounted at the open receiving end of said casing and adapted to pick cotton and having means for automatically and positively freeing itself from the picked cotton and depositing the cotton upon the conveyer-belt, a driving-shaft, and independent means separately connecting said driving-shaft with the conveyer-belt and said cotton-picking means, the conveyer-belt acting solely as a conveyer and the picking means solely as a picker, substantially as set forth.

5. In a machine of the character described, the combination of the main frame and casing, a cylinder journaled in one end of said frame, picking-fingers loosely hung in said cylinder, a shell surrounding said cylinder and journaled eccentrically thereto, and having perforations therein, through which said fingers project, means for simultaneously driving said cylinder and shell, and means for receiving cotton from said picking-fingers and conveying it through said casing for the purpose explained.

6. In a machine of the character described, the combination of a supporting-frame, a cylinder journaled therein, a shell surrounding said cylinder and journaled eccentrically thereto, a plurality of picking-fingers projecting through said shell in such manner as to be held tangential to said cylinder, and means projecting from the said cylinder and engaging said shell and capable, when said cylinder is rotated, of driving the shell, for the purpose explained.

7. In a machine of the character described, the combination of a supporting-frame, a cylinder journaled therein, a shell surrounding said cylinder and journaled eccentrically thereto, a plurality of picking-fingers projecting through said shell in such manner as to be held tangential to said cylinder, and a plurality of driving-fingers carried by said cylinder, and projecting through said shell and capable, when said cylinder is rotated, of driving the shell, for the purpose explained.

8. In a machine of the character described, the combination of a supporting-frame, a cylinder provided with circumferential grooves and journaled in said frame, a shell surrounding said cylinder and journaled eccentrically thereto, a plurality of picking-fingers freely journaled in the circumferential grooves of said cylinder and held tangential to said cylinder by the shell, and a plurality of driving-fingers secured to the cylinder and adapted to engage the shell for the purpose explained.

9. In a machine of the character described, the combination of the supporting-frame, a cylinder journaled in said frame, means for driving said cylinder, a plurality of picking-fingers carried by said cylinder, a shell surrounding said cylinder and journaled eccentrically thereto, and provided with openings through which the picking-fingers project, and a plurality of driving-fingers carried by said cylinder and engaging said shell and capable of holding said shell in position to retain the picking-fingers tangential to the cylinder, for the purpose explained.

THEODORE H. PRICE.
WILLIAM P. QUENTELL.

Witnesses:
ANGUS P. MASON,
R. R. COATS.